United States Patent
Hsieh et al.

(10) Patent No.: US 10,969,912 B2
(45) Date of Patent: Apr. 6, 2021

(54) CAPACITIVE SENSING AND SAMPLING CIRCUIT AND SENSING AND SAMPLING METHOD THEREOF

(71) Applicant: ELAN MICROELECTRONICS CORPORATION, Hsinchu (TW)

(72) Inventors: Kun-Lin Hsieh, Pitou Township, Changhua County (TW); Jyun-Yu Chen, Hsinchu (TW); Chia-Hsing Lin, Hsinchu (TW)

(73) Assignee: ELAN MICROELECTRONICS CORPORATION, Hsinchu (TW)

( * ) Notice: Subject to any disclaimer, the term of this patent is extended or adjusted under 35 U.S.C. 154(b) by 0 days.

(21) Appl. No.: 16/579,266

(22) Filed: Sep. 23, 2019

(65) Prior Publication Data
US 2020/0117292 A1    Apr. 16, 2020

(30) Foreign Application Priority Data
Oct. 11, 2018  (TW) .................................. 107135852

(51) Int. Cl.
G09G 1/00      (2006.01)
G06F 3/044     (2006.01)
G06F 3/041     (2006.01)

(52) U.S. Cl.
CPC ............ *G06F 3/044* (2013.01); *G06F 3/0418* (2013.01)

(58) Field of Classification Search
None
See application file for complete search history.

(56) References Cited

U.S. PATENT DOCUMENTS

2018/0121019 A1* 5/2018 Lee .................... G06F 3/0418
2018/0349662 A1* 12/2018 Lin ....................... G06K 9/40

* cited by examiner

*Primary Examiner* — Michael A Faragalla
(74) *Attorney, Agent, or Firm* — patenttm.us

(57) ABSTRACT

A capacitive sensing and sampling circuit and method thereof are disclosed. The capacitive sensing and sampling circuit has a voltage source, a sensing unit and a detecting circuit. The detecting unit has a first sensing output unit, a second sensing output unit and a sampling unit. The first and second sensing output units are electrically connected to an output of the sensing unit and the sampling unit. Therefore, by increasing the number of alternatively sensing the capacitive sensing component to obtain more capacitive signals, the number of sampling the sensed capacitive signal is relatively increased. Therefore, the white noise interference for the capacitive sensing and sampling circuit is effectively suppressed, so the signal-to-noise ratio is increased and accuracy of detecting coordinates of the touch object is increased.

17 Claims, 8 Drawing Sheets

CAPACITIVE SENSING AND SAMPLING CIRCUIT AND SENSING AND SAMPLING METHOD THEREOF

CROSS-REFERENCE TO RELATED APPLICATIONS

This application is based upon and claims priority under 35 U.S.C. 119 from Taiwan Patent Application No. 107135852 filed on Oct. 11, 2018, which is hereby explicitly incorporated herein by this reference thereto.

BACKGROUND OF THE INVENTION

1. Field of the Invention

The present invention is related to a sensing and sampling circuit and method, and more particularly to a capacitive sensing and sampling circuit and method for white noise suppression.

2. Description of the Prior Arts

In a display panel, a touch with display driver (hereinafter TDDI) is employed and integrates a panel driving circuit and a touch sensing circuit. In general, the panel driving circuit and touch sensing circuit operate at different times to respectively drive the panel and sense a touch object. Therefore, in a condition with less sampling time, a sampling number of the touch sensing circuit in TDDI is less than that of a touch sensing circuit in an out-cell touch panel.

In a condition with less sampling numbers, as shown in FIG. 6, a signal-to-noise ratio of a capacitive sensing and sampling circuit is shown in a frequency domain. In the frequency domain, the signal-to-noise ratios at 50 Hz and frequencies multiple of 50 Hz are easily interfered by white noise, and the signal-to-noise ratio is decreased to reduce accuracy of calculating the touch object's coordinates.

To overcome the shortcomings, the present invention provides a new a capacitive sensing and sampling circuit and method to mitigate or obviate the aforementioned problems.

SUMMARY OF THE INVENTION

The objective of the present invention provides a capacitive sensing and sampling circuit and method to suppress interference from the white noise.

To achieve the objective, the capacitive sensing and sampling circuit has:

a voltage source at least having a first voltage level and at least one second voltage level; and a detecting circuit having a first sensing output unit, a second sensing output unit and a sampling unit, wherein the first and second sensing output units are electrically connected to a first connecting node between the capacitive sensing component and the sampling unit; wherein:

the capacitive sensing component is sequentially driven by the voltage source with the 1st-P voltage level and the 2nd-P voltage level, wherein:

when the capacitive sensing component is driven by the voltage source with the first voltage level, the first sensing output unit senses a first capacitive signal and outputs the sensed first capacitive signal to the sampling unit and then the sampling unit for sampling; and when the capacitive sensing component is driven by the voltage source with the second voltage level, the second sensing output unit senses a second capacitive signal and outputs the sensed second capacitive signal to the sampling unit and then the sampling unit for sampling.

Based on the foregoing description, in the capacitive sensing and sampling circuit, the sensing unit has the first and second sensing output units to alternatively sense the capacitive sensing component to obtain multiple capacitive signals and output the sensed capacitive signals to the sampling unit. Since the capacitive sensing component is driven by the voltage source with different voltage levels and a number of alternatively sensing the capacitive sensing component is increased, a number of sampling the sensed capacitive signal is relatively increased. Therefore, the white noise interference for the capacitive sensing and sampling circuit is effectively suppressed, so the signal-to-noise ratio is increased and accuracy of detecting coordinates of the touch object is increased.

To achieve the objective, the sensing and sampling method of a capacitive sensing and sampling circuit having at least two sensing output units and a sampling unit, wherein the sensing and sampling has steps of:

(a) in a sensing period, driving a capacitive sensing component by a voltage source with multiple different voltage levels;

(b) alternatively sensing the capacitive sensing component by the first and second sensing output units to obtain multiple capacitive signals when the capacitive sensing component is driven by the voltage source with the multiple different voltage levels; and (c) sampling the capacitive signals by the sampling unit.

Based on the foregoing description, in the first sensing phase of the sensing period of the sensing and sampling method, the voltage source with a first voltage level and a second voltage level are provided to drive the capacitive sensing component. After the capacitive sensing component is driven by the voltage source with the first voltage level, a capacitive signal of the capacitive sensing component is sensed and then sampled. After the capacitive sensing component is driven by the voltage source with the second voltage level, a capacitive signal of the capacitive sensing component is sensed and then sampled. Therefore, in the first sensing phase of the sensing period, the voltage source with different voltage levels are provided to drive the capacitive sensing component, so a number of alternatively sensing the capacitive sensing component and a number of sampling the sensed capacitive signal are increased. Therefore, the white noise interference for the capacitive sensing and sampling circuit is effectively suppressed, so the signal-to-noise ratio is increased and accuracy of detecting coordinates of the touch object is increased.

Other objectives, advantages and novel features of the invention will become more apparent from the following detailed description when taken in conjunction with the accompanying drawings.

DETAILED DESCRIPTION OF THE PREFERRED EMBODIMENTS

The present invention provides a capacitive sensing and sampling circuit and method and the present invention is described in detail as follow by providing multiple embodiments and related drawings.

Figure 1A:
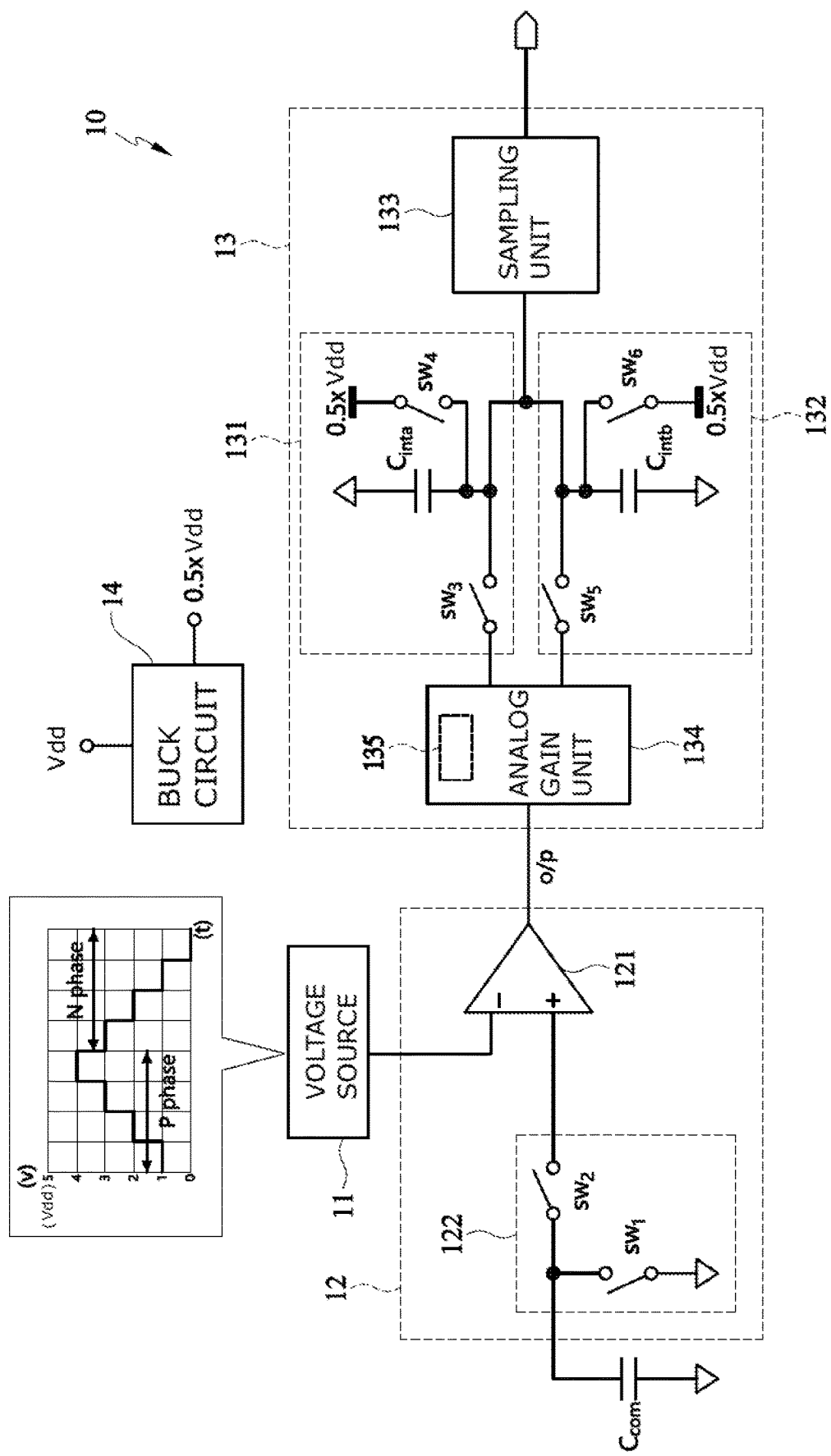
FIG. 1A is a circuit diagram of a first embodiment of a capacitive sensing and sampling circuit in accordance with the present invention.

With reference to FIG. 1A, a circuit diagram of the capacitive sensing and sampling circuit 10 of the present invention and the capacitive sensing and sampling circuit 10 has a voltage source 11, a sensing unit 12 and a detecting circuit 13. The voltage source 11 is electrically connected to the sensing unit 12. The detecting circuit 13 is electrically connected to the sensing unit 12.

In the first embodiment, the voltage source 11 is a digital sine wave voltage source. An operation period of the digital sine wave voltage source corresponds to a sensing period D. The operation period has a rise time and a fall time. The sensing period D has a first sensing phase (hereinafter P phase) and a second sensing phase (hereinafter N phase). A time length of the P phase is equal to that of the N phase. The voltage source 11 at least has a first voltage level and a second voltage level. The first voltage level is a voltage level that is provided for driving in a first time in the P phase and in the N phase. The second voltage level is a voltage level that is provided for driving in a second time in the P phase and in the N phase. In particular, the P phase corresponds to the rise time of the voltage source 11 and the N phase corresponds to the fall time of the voltage source 11. Therefore, in the rise time of the digital sine wave voltage source, the first voltage level is smaller than the second voltage level. In the fall time of the digital sine wave voltage source, the first voltage level is larger than the second voltage level. In addition, a difference between the first and second voltage levels in the P phase is equal to a difference between the first and second voltage levels in the N phase.

The sensing unit 12 is electrically connected to the voltage source 11 and a capacitive sensing component $C_{com}$. In a touch application, the capacitive sensing component $C_{com}$ is a common electrode of a display panel but not limited to. In the first embodiment, the sensing unit 12 has an amplifier 121 and a switching unit 122. The amplifier 121 has a negative input (−), a non-negative input (+) and an output o/p. The negative input (−) is electrically connected to the voltage source 11, and the non-negative input (+) is electrically connected to the capacitive sensing component $C_{com}$ through the switching unit 122. The switching unit 122 has a first switch $SW_1$ and a second switch $SW_2$. The first switch $SW_1$ is electrically connected between the sensing unit 12 and the capacitive sensing component $C_{com}$. One end of the second switch $SW_2$ is electrically connected to a connecting node between the first switch $SW_1$ and the capacitive sensing component $C_{om}$ and the other end of the second switch $SW_2$ is electrically connected to a reference voltage of a system power, such as the ground of the system power.

The detecting circuit 13 is electrically connected to the output o/p of the sensing unit 12 and has a first sensing output unit 131, a second sensing output unit 132 and a sampling unit 133. The first sensing output unit 131 and the second sensing output unit 132 are electrically connected between the output o/p of the sensing unit 12 and the sampling unit 133. Each of the first and second sensing output units 131, 132 has a third switch $SW_3$, $SW_5$, a sensing capacitor $C_{inta}$, $C_{intb}$, and a fourth switch $SW_4$, $SW_6$. The third switch $SW_3$, $SW_5$ is electrically connected between the output o/p of the sensing unit 12 and the sampling unit 133. One end of the sensing capacitor $C_{inta}$, $C_{intb}$ is electrically connected to a connecting node of the corresponding third switch $SW_3$, $SW_5$ and the sampling unit 133 and the other end thereof is electrically connected to the reference voltage of the system power. One end of the fourth switch $SW_4$, $SW_6$ is electrically connected to the one end of the sensing capacitor $C_{inta}$, $C_{intb}$ and the other end thereof is electrically connected to a voltage with a reset voltage level. In the first embodiment, the fourth switch $SW_4$ is electrically connected to a constant voltage Vdd with highest voltage level through a buck circuit 14, so the reset voltage level of the voltage is less than the highest voltage level of the constant voltage Vdd. For example, the reset voltage level is half of the highest voltage (0.5*Vdd). Notably, the first sensing output unit 131 and second sensing output unit 132 are electrically connected to the output o/p of the sensing unit 12 through an analog gain unit 134 to adjust a gain of an output signal of the sensing unit 12 according to particular circuit requirements.

With reference to FIG. 2, before the capacitive sensing and sampling circuit 10 starts to sense a touch object, the first switch $SW_1$ of the switching unit 122 of the sensing unit 12 turns on, but the second switch $SW_2$ turns off to reset the capacitive sensing component $C_{com}$ and to clear charges therein. Next to enter the sensing period D, the first switch $SW_1$ turns off but the second switch $SW_2$ turns on in the sensing period D. In the following, take a single sensing period D as an example to describe a sensing and sampling procedure of the capacitive sensing and sampling circuit 10 for the touch object in detail.

In the P phase of the sensing period D, the sensing unit 12 uses the voltage source 11 with the first voltage level through the amplifier 121 to drive the capacitive sensing component $C_{com}$ since the second switch $SW_2$ of the switching unit 122 of the sensing unit 12 turns on. At the time, the third switch $SW_3$ of the first sensing output unit 131 turns on, but the fourth switch $SW_4$ turns off, so a current mirror 135 of the analog gain unit 134 starts to charge or discharge the sensing capacitor $C_{inta}$ of the first sensing output unit 131 according to the first voltage level. After a while, charges (hereafter capacitive signal) are stored in the sensing capacitor $C_{inta}$, and the third switch $SW_3$ of the first sensing output unit 131 turns off. Next, the sampling unit 133 samples the capacitive signal of the sensing capacitor $C_{inta}$ of the first sensing output unit 131 and then the fourth switch $SW_4$ of the first sensing output unit 131 turns on to clean the charges stored in the sensing capacitor $C_{inta}$ and wait for the next time of sensing the capacitive signal. Therefore, in the P phase of the sensing period D, the first sensing output unit 131 senses the capacitive sensing component $C_{com}$ and then outputs the sensed capacitive signal to the sampling unit 133 to sample the sensed capacitive signal after the sensing unit 12 uses the voltage source 11 with the first voltage level to drive the capacitive sensing component $C_{com}$.

In the P phase of the sensing period D, the amplifier 121 of the sensing unit 12 uses the voltage source 11 with the second voltage level to drive the capacitive sensing component $C_{com}$ after the third switch $SW_3$ of the first sensing output unit 131 turns on. At the time, the third switch $SW_5$ of the second sensing output unit 132 turns on, but the fourth switch $SW_6$ turns off, so a current mirror 135 of the analog gain unit 134 starts to charge or discharge the sensing capacitor $C_{intb}$ of the second sensing output unit 132 according to the second voltage level. After a while, the charges (hereafter capacitive signal) are stored in the sensing capacitor $C_{intb}$ and the third switch $SW_5$ of the second sensing output unit 132 turns off. Next, the sampling unit 133 samples the capacitive signal of the sensing capacitor $C_{intb}$ of the second sensing output unit 132 and then the fourth switch $SW_6$ of the second sensing output unit 132 turns on to clean the charges stored in the sensing capacitor $C_{intb}$ and wait for the next time of sensing capacitive signal. Therefore, in the P phase of the sensing period D, the sensing unit 12 uses the voltage source 11 with the second voltage level to drive the capacitive sensing component $C_{com}$ and then the second sensing output unit 132 senses the capacitive sensing component $C_{com}$ and outputs the sensed capacitive signal to the sampling unit 133 to sample the sensed capacitive signal.

So far, the capacitive sensing and sampling circuit 10 has sensed and sampled the capacitive signal for two times in the P phase of the sensing period D. Then the N phase of the sensing period D is entered. The sensing unit 12 sequentially uses the voltage source 11 of the first and second voltage levels to drive the capacitive sensing component $C_{com}$ through the amplifier 121. After the capacitive sensing component $C_{com}$ is driven by the voltage source with the first voltage level, the first sensing output unit 131 senses the capacitive sensing component $C_{com}$ through the sensing capacitor $C_{inta}$ and then outputs the sensed capacitive signal of the sensing capacitor $C_{inta}$ to the sampling unit 133. The sampling unit 133 samples the sensed capacitive signal. In the first embodiment, the first voltage level in the P phase is different from the first voltage level in the N phase and the second voltage level in the P phase is different from the second voltage level in the N phase. However, the difference between the first and second voltage levels in the P phase is equal to that in the N phase. In another embodiment, the first voltage level in the P phase may be equal to the first voltage level in the N phase, the second voltage level in the P phase may be equal to the second voltage level in the N phase, but the difference between the first and second voltage levels in the P phase is still equal to that in the N phase.

Figure 1B:
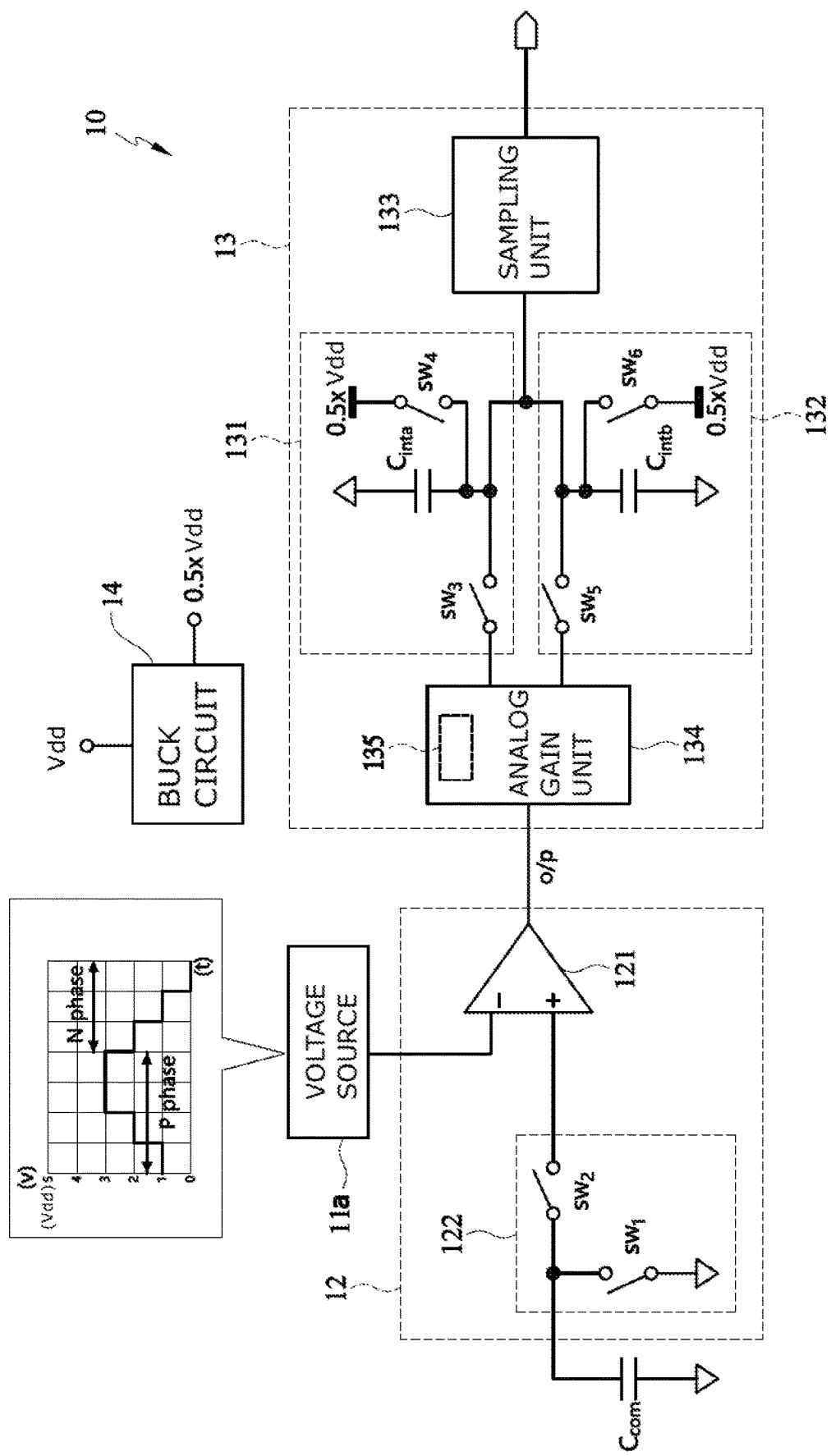
FIG. 1B is a circuit diagram of a second embodiment of a capacitive sensing and sampling circuit in accordance with the present invention.

To increase the number of sampling capacitive signal, in a second embodiment as shown in FIG. 1B, another digital sin wave voltage source 11a is used and further has a third voltage level. In the rise time of the digital sin wave voltage source 11a, the first voltage level is smaller than the second voltage level, and the second voltage level is smaller than the third voltage level. In the fall time of the digital sin wave voltage source 11a, the first voltage level is larger than the second voltage level, and the second voltage level is larger than the third voltage level. Notably, the difference between the first and second voltage levels in the P phase is equal to that in the N phase and a difference between the second and third voltage levels in the P phase is equal to that in the N phase.

As a comparison with a circuit operation in the first embodiment, in the second embodiment as shown in FIG. 1B, in the P phase of the sensing period D, after the capacitive sensing component $C_{com}$ is driven by the voltage source with the second voltage level and the corresponding capacitive signal is sensed, the voltage source 11a with the third voltage level is used to drive the capacitive sensing component $C_{com}$ through the amplifier 121 of the sensing unit 12. At the time, the third switch $SW_3$ of the first sensing output unit 131 turns on, but the fourth switch $SW_4$ turns off. Therefore, the sensing capacitor $C_{inta}$ of the first sensing output unit 131 starts to sense the capacitive signal. The related sensing operation in detail is mentioned above in the first embodiment but is not repeated here. Next, the sampling unit 133 samples the capacitive signal of the sensing capacitor $C_{inta}$. Therefore, in the P phase of the sensing period D, when the voltage source 11a with the third voltage level drives the capacitive sensing component $C_{com}$ through the sensing unit 12, the first sensing output unit 131 senses the sensing capacitor $C_{inta}$ and then the sampling unit 133 samples the capacitive signal. So far, the capacitive sensing and sampling circuit 10 has sensed and sampled the capacitive signal for three times in the P phase of the sensing period D. Then the N phase of the sensing period D is entered. The sensing unit 12 sequentially uses the first voltage level, the voltage source 11a with the second voltage level and the third voltage level to drive the capacitive sensing component $C_{com}$ through the amplifier 121. When the capacitive sensing component $C_{com}$ is driven by the voltage source with the first voltage level, the second sensing output unit 132 senses the capacitive sensing component $C_{com}$ and outputs the capacitive signal of the sensing capacitor $C_{intb}$ to the sampling unit 133. The sampling unit 133 samples the sensed capacitive signal of the sensing capacitor $C_{intb}$. After then the capacitive sensing component $C_{com}$ is driven by the voltage source with the second voltage level, the first sensing output unit 131 senses the capacitive sensing component $C_{com}$ and outputs the capacitive signal of the sensing capacitor $C_{inta}$ to the sampling unit 133. The sampling unit 133 samples the sensed capacitive signal. Next, the capacitive sensing component $C_{com}$ is driven by the voltage source with the third voltage level, the second sensing output unit 132 senses the capacitive sensing component $C_{com}$ and outputs the capacitive signal of the sensing capacitor $C_{intb}$ to the sampling unit 133. The sampling unit 133 samples the sensed capacitive signal. In the second embodiment, the first voltage level in the P phase is different from the first voltage level in the N phase, the second voltage level in the P phase is different from the second voltage level in the N phase, and the third voltage level in the P phase is different from the third voltage level in the N phase. However, the difference between the first and second voltage levels in the P phase is equal to the difference between the first and second voltage levels in the N phase and a difference between the second and third voltage levels in the P phase is equal to the difference between the second and third voltage levels in the N phase.

Figure 1C:
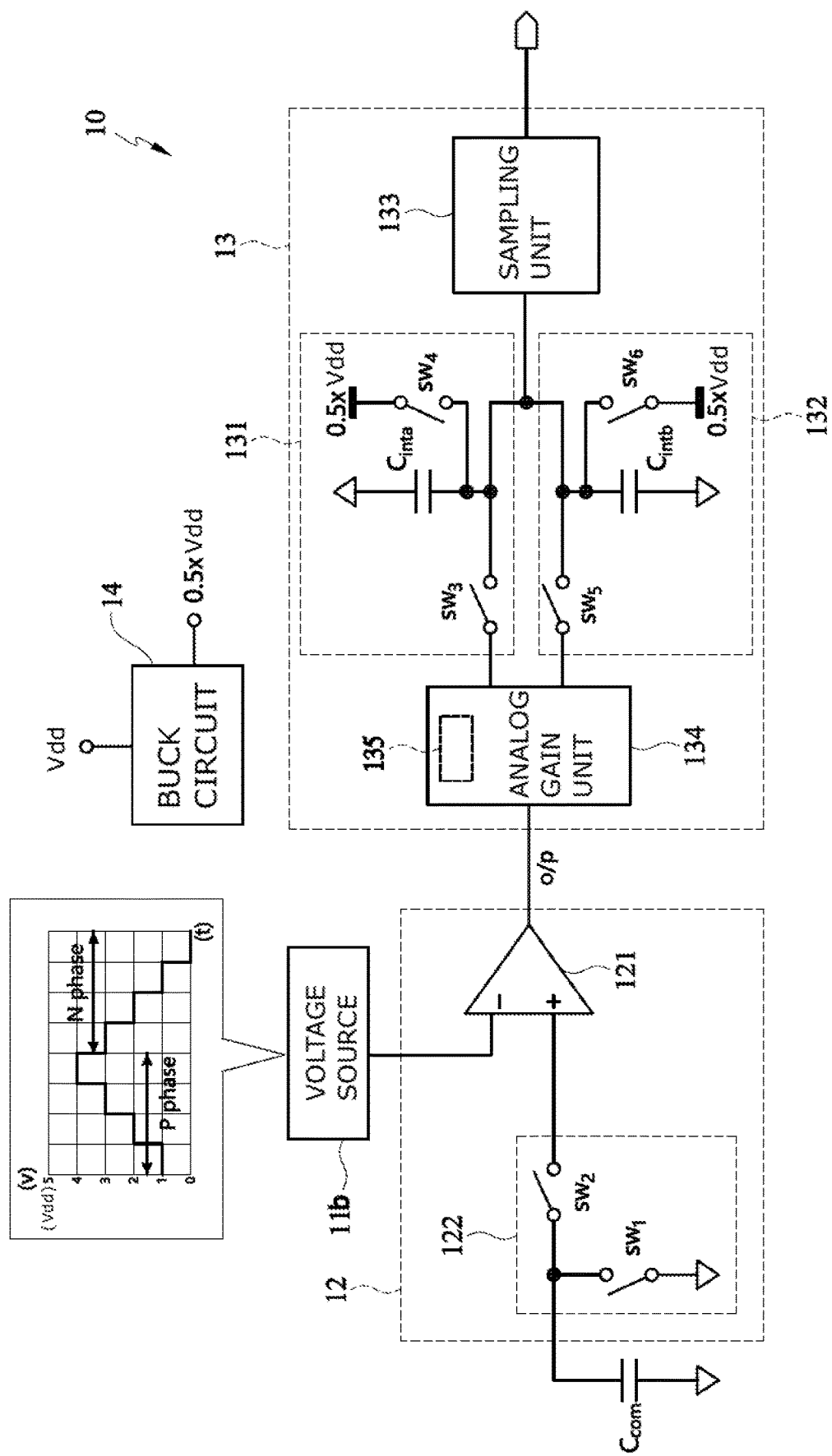
FIG. 1C is a circuit diagram of a third embodiment of a capacitive sensing and sampling circuit in accordance with the present invention.

To increase the number of sampling capacitive signal, in a third embodiment as shown in FIG. 1C, a digital sin wave voltage source 11b further has a fourth voltage level. In the rise time of the sin wave voltage source 11b, the first voltage level is smaller than the second voltage level, the second voltage level is smaller than the third voltage level, and the third voltage is smaller than the fourth voltage level, but not limited to. In the fall time of the digital sine wave voltage source 11b, the first voltage level is larger than the second voltage level, the second voltage level is larger than the third voltage level and the third voltage is larger than the fourth voltage, but not limited to. Notably, the difference between the first and second voltage levels in the P phase is equal to the difference between the first and second voltage levels in the N phase, a difference between the second and third voltage levels in the P phase is equal to the difference between the second and third voltage levels in the N phase and a difference between the third and fourth voltage levels in the P phase is equal to the difference between the third and fourth voltage levels in the N phase.

Figure 2A:
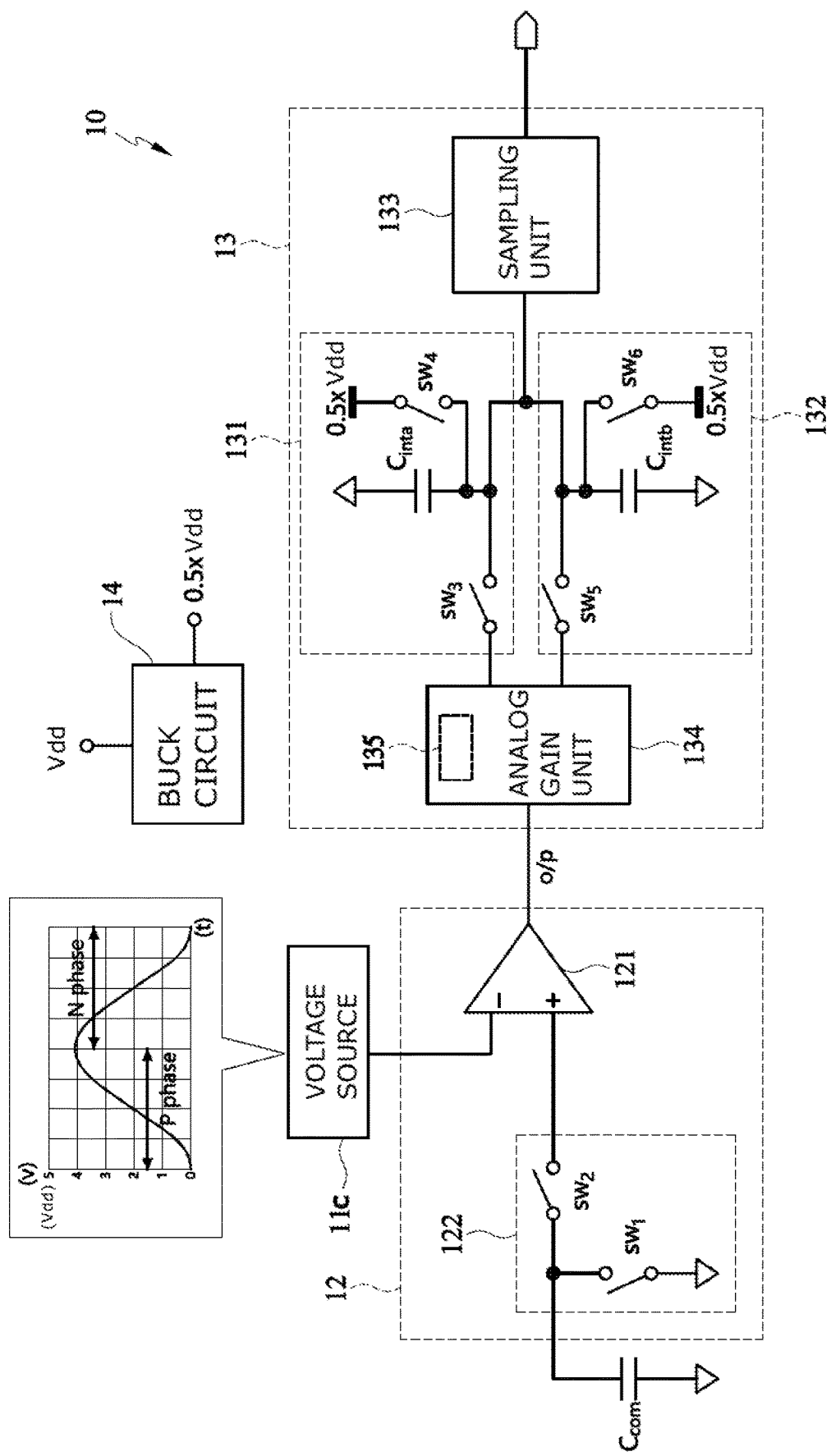
FIG. 2A is a circuit diagram of a fourth embodiment of a capacitive sensing and sampling circuit in accordance with the present invention.
Figure 2B:
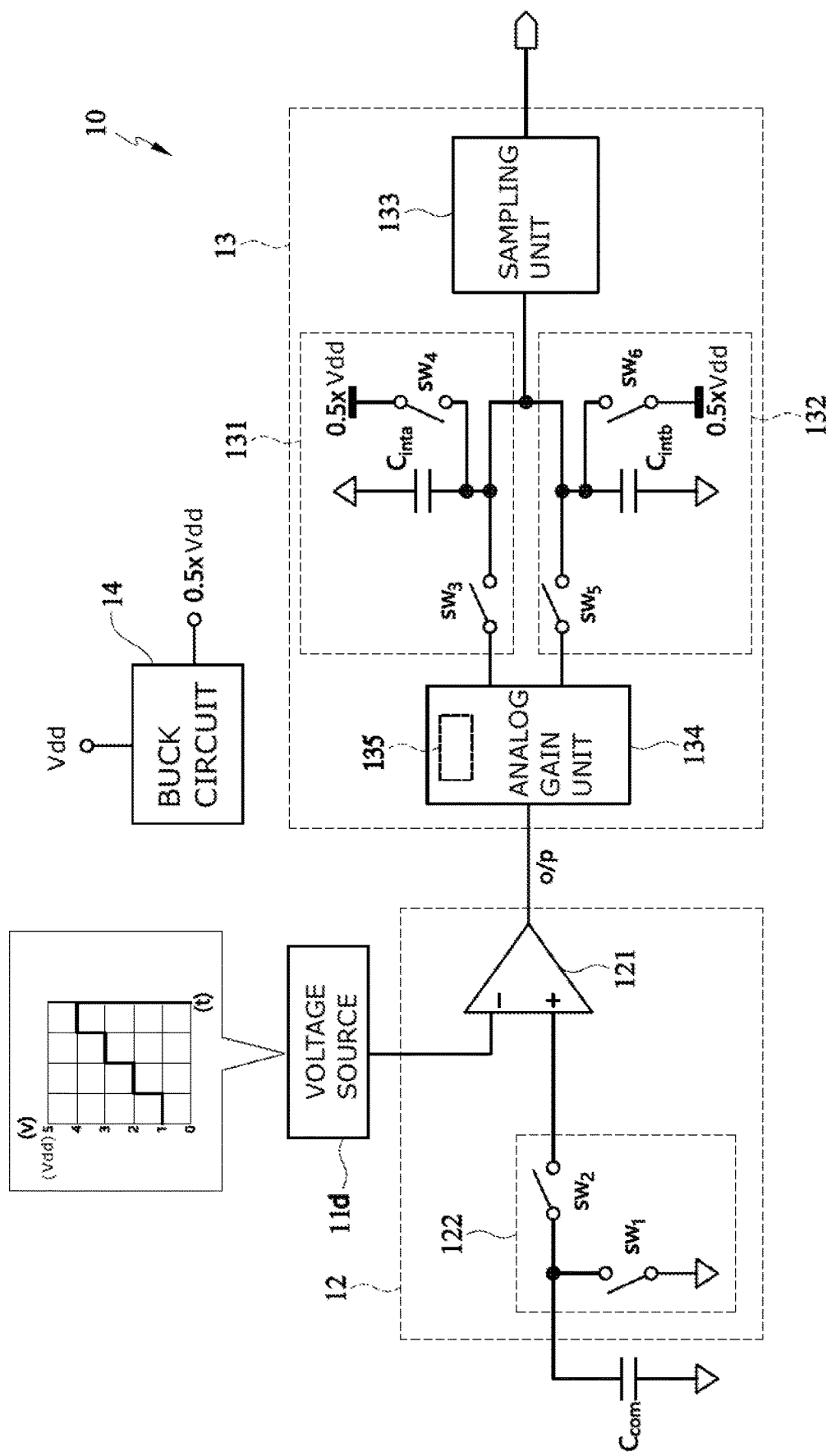
FIG. 2B is a circuit diagram of a fifth embodiment of a capacitive sensing and sampling circuit in accordance with the present invention.
Figure 3:
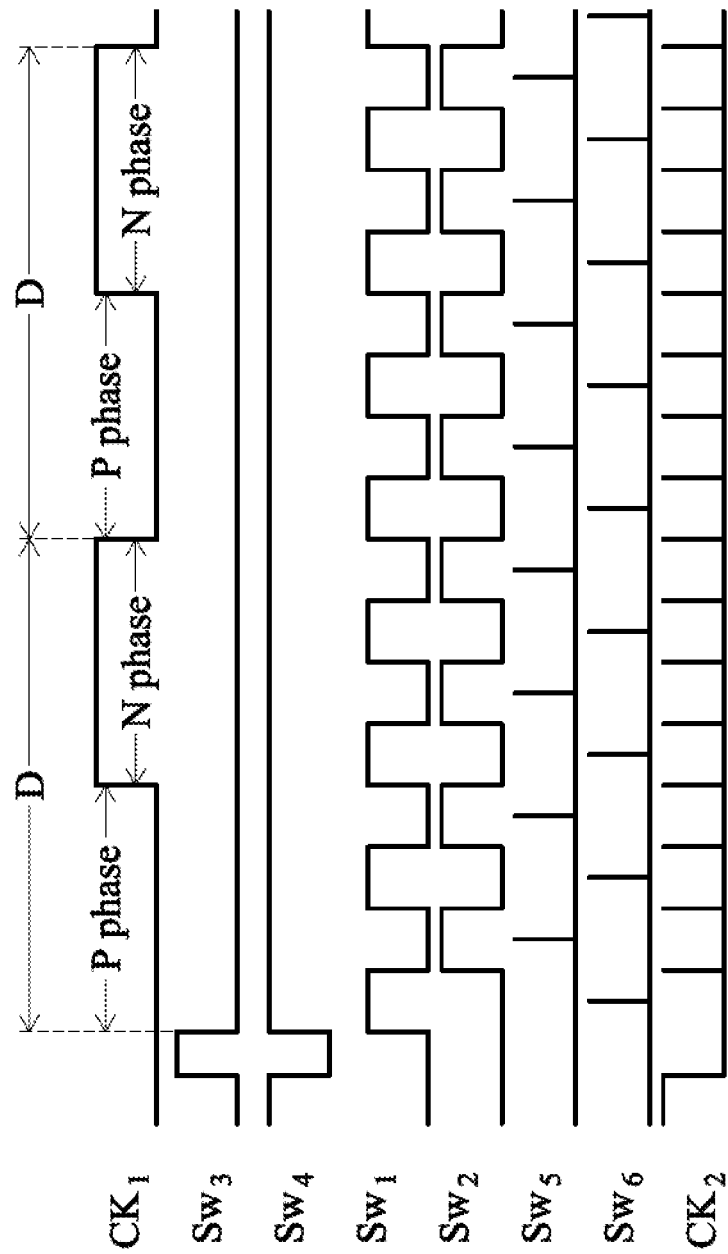
FIG. 3 is a time sequence diagram of different controlling signals of electronic components of FIG. 1C.

As a comparison with a circuit operation in the second embodiment, in the third embodiment, in the P phase of the sensing period D, after the capacitive sensing component $C_{com}$ is driven by the voltage source with the third voltage level and the corresponding capacitive signal is sensed, the voltage source 11b with the fourth voltage level is used to drive the capacitive sensing component $C_{com}$ through the amplifier 121 of the sensing unit 12. At the time, the third switch $SW_5$ of the second sensing output unit 132 turns on, but the fourth switch $SW_6$ turns off. Therefore, the sensing capacitor $C_{intb}$ of the first sensing output unit 132 starts to sense the touch object and related sensing detail is mentioned above for the first embodiment, so the details are not repeated here. Next, the sampling unit 133 samples the capacitive signal of the sensing capacitor $C_{intb}$. So far, the capacitive sensing and sampling circuit 10 has sensed and sampled the capacitive signal for four times in the P phase of the sensing period D. Then the N phase of the sensing period D is entered. The sensing unit 12 sequentially uses the first voltage level, the second voltage level, the voltage source 11b with the third voltage level and the fourth voltage level to drive the capacitive sensing component $C_{com}$ through the amplifier 121. When the capacitive sensing component $C_{com}$ is driven by the voltage source with the first voltage level, the first sensing output unit 131 senses the capacitive sensing component $C_{com}$ through the sensing capacitor $C_{inta}$ and outputs the capacitive signal of the sensing capacitor $C_{inta}$ to the sampling unit 133. The sampling unit 133 samples the sensed capacitive signal. After then the capacitive sensing component $C_{com}$ is driven by the voltage source with the second voltage level, the second sensing output unit 132 senses the capacitive sensing component $C_{com}$ through the sensing capacitor $C_{intb}$ and outputs the capacitive signal of the sensing capacitor $C_{intb}$ to the sampling unit 133. The sampling unit 133 samples the sensed capacitive signal. Next, the capacitive sensing component $C_{com}$ is driven by the voltage source with the third voltage level, the first sensing output unit 131 senses the capacitive sensing component $C_{com}$ through the sensing capacitor $C_{inta}$ and outputs the capacitive signal of the sensing capacitor $C_{inta}$ to the sampling unit 133. The sampling unit 133 samples the sensed capacitive signal. After then the capacitive sensing component $C_{com}$ is driven by the voltage source with the fourth voltage level, the second sensing output unit 132 senses the capacitive sensing component $C_{com}$ through the sensing capacitor $C_{intb}$ and outputs the capacitive signal of the sensing capacitor $C_{intb}$ to the sampling unit 133 samples the sensed capacitive signal. The details of sensing operation in the third embodiment can be more clearly understood with a timing sequence diagram as shown in FIG. 3. Therefore, in single sensing period D, the capacitive sensing and sampling circuit 10 in accordance with the present invention uses the voltage source 11, 11a, 11b with the different voltage levels in P phase and in N phase to alternatively sense the capacitive sensing component $C_{com}$ to obtain the multiple capacitive signals by the first and second sensing output units 131, 132. Therefore, the sampling unit 133 can sample the capacitive signal four times, six times, eight times or even more times. In the fourth embodiment as shown in FIG. 2A, when the voltage source 11c is an analog sin wave voltage source providing multiple different voltage levels and a time length of alternatively sensing touch object by the first and second sensing output units 131, 132 is shortened, the number of sampling capacitive signal in the single sensing period D is increased. In a fifth embodiment as shown in FIG. 2B, as a comparison with the sensing period D in FIGS. 1C and 2A, a sensing period D of the voltage source 11d of the fifth embodiment does not have the two sensing phases, only has one sensing phase corresponding to the first sensing phase or the second sensing phase as shown in FIGS. 1C and 2A and provides different voltage levels.

Figure 4:
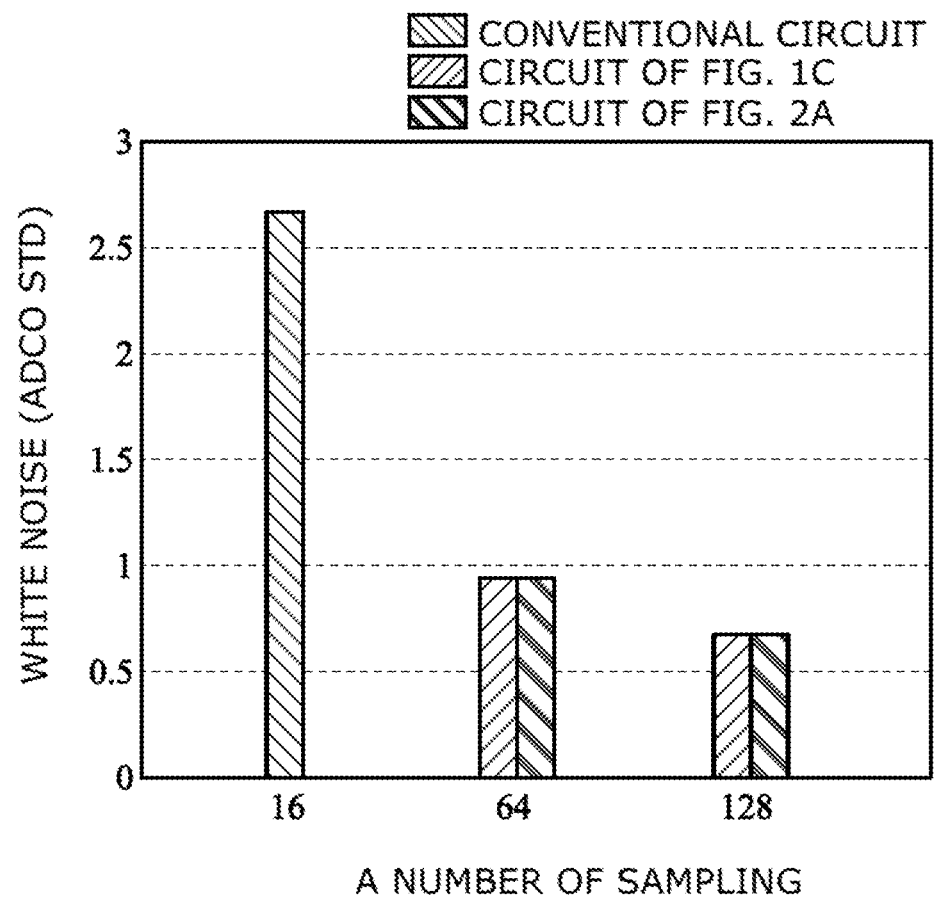
FIG. 4 is a white noise STD comparison chart.
Figure 5A:
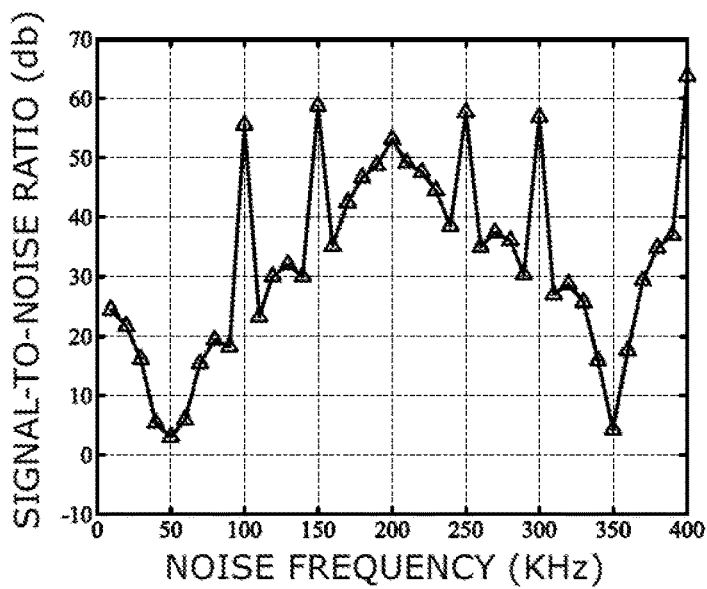
FIG. 5A is a signal-to-noise ratio shown in the frequency domain, wherein the signal-to-noise signal is obtained by a signal is sampled eight times in one sensing period.
Figure 5B:
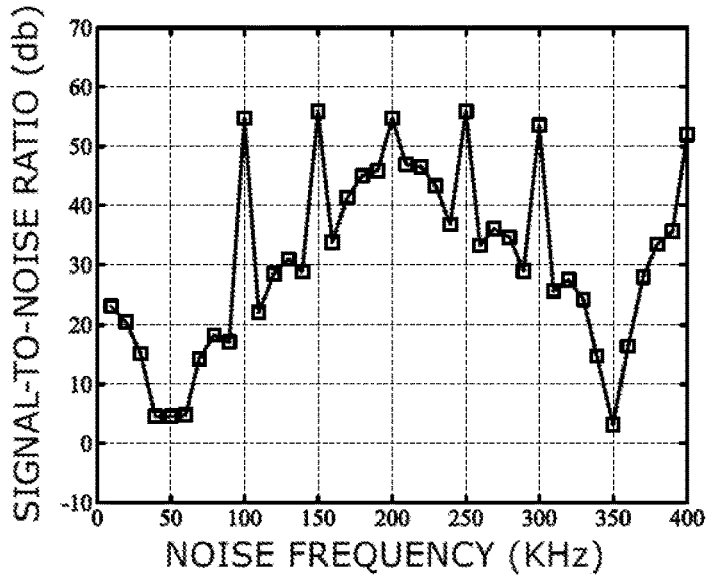
FIG. 5B is a signal-to-noise ratio shown in the frequency domain, wherein the signal-to-noise signal is obtained by a signal is sampled sixteen times in one sensing period.
Figure 6:
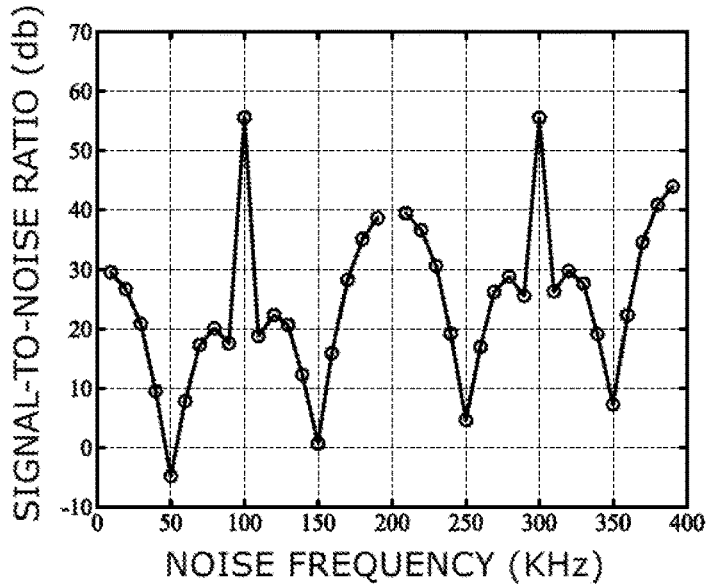
FIG. 6 is a signal-to-noise ratio shown in the frequency domain, wherein the signal-to-noise signal is obtained by a signal is sampled two times in one sensing period.

With reference to FIG. 4, a conventional capacitive sensing and sampling circuit samples the capacitive signal for sixteen times after eight sensing periods D and the white noise thereof shown in a frequency domain is 2.6. In one embodiment of the present invention as shown in FIG. 1C, the capacitive sensing and sampling circuit 10 samples the capacitive signal for 64 times after eight sensing periods D, the white noise thereof is lower than one. Also, as shown in FIG. 2A, the capacitive sensing and sampling circuit 10 samples the capacitive signal for 128 times, the white noise is lower than one. Therefore, the present invention suppresses white noise interference. As a comparison with FIG. 6, the signal-to-noise ratios at 50 kHz, 200 kHz and 250 kHz are significantly increased in FIGS. 5A and 5B.

Therefore, a sensing and sampling method of the capacitive sensing and sampling circuit in accordance with the present invention has steps of providing the voltage source with multiple different voltage levels to drive the capacitive sensing component in the sensing period D by different voltage levels; sensing the capacitive sensing component to output the capacitive signal after each time of driving capacitive sensing component; and sampling the sensed capacitive signal after each time of sensing capacitive signal.

In particular, the capacitive sensing and sampling circuit 10 has a first sensing output unit 131, a second sensing output unit 132 and a sampling unit 133. In FIG. 2B, the sensing period only has a first sensing phase (P phase) and a first voltage level and a second voltage level are provided in the P phase. In the P phase, a third voltage level and a fourth voltage level may be further provided. When the capacitive sensing component $C_{com}$ is driven by the voltage source with the first voltage level, the first sensing output unit 131 firstly senses a capacitive signal and then the sampling unit 133 samples the sensed capacitive signal. Then when the capacitive sensing component $C_{com}$ is driven by the voltage source with the second voltage level, the second sensing output unit 132 senses another capacitive signal and the sampling unit 133 samples the sensed capacitive signal. According to this sequence, when the capacitive sensing component $C_{com}$ is driven by the voltage source with the third voltage level, the first sensing output unit 131 senses a capacitive signal and the sampling unit 133 samples the sensed capacitive signal. When the capacitive sensing component $C_{com}$ is driven by the voltage source with the fourth voltage level, the second sensing output unit 132 senses a capacitive signal and the sampling unit 133 samples the sensed capacitive signal. In one embodiment, the first to fourth voltage levels are getting higher with time.

With reference to FIGS. 1 and 2A, the sensing period D is divided into a first sensing phase (hereinafter P phase) and a second sensing phase (hereinafter N phase). A first voltage level and a second voltage level are provided in each of the P and N phases. In the P phase, the capacitive sensing component $C_{com}$ is driven by the voltage source with the first voltage level, then the first sensing output unit 131 senses a capacitive signal and then the sampling unit 133 samples the sensed capacitive signal. Next to drive the capacitive sensing component $C_{com}$ by voltage source with the second voltage level, the second sensing output unit 132 senses another capacitive signal, and then the sampling unit 133 samples the sensed capacitive signal. Next to enter the N phase, the capacitive sensing component $C_{com}$ is driven by the voltage source with the first voltage level, then the first sensing output unit 131 senses another capacitive signal and then the sampling unit 133 samples the sensed capacitive signal. After then, the capacitive sensing component $C_{com}$ is driven by the voltage source with the second voltage, then the second sensing output unit 132 senses another capacitive signal, and then the sampling unit 133 samples the sensed capacitive signal.

With reference to FIGS. 1A and 2A, if the first to third voltage levels are sequentially provided in each of the P and N phases, after the capacitive sensing component $C_{com}$ is driven by the voltage source with the first and third voltage levels in the P phase and the second voltage level in the N phase, the first sensing output unit 131 senses the capacitive sensing component $C_{com}$. After the capacitive sensing component $C_{com}$ is driven by the voltage source with the second voltage levels in the P phase and the first and third voltage levels in the N phase, the second sensing output unit 132 senses the capacitive sensing component $C_{com}$. Therefore, the capacitive signal is obtained by alternatively sensing the capacitive sensing component through the first and second sensing output units 131, 132 after each time of driving the capacitive sensing component $C_{com}$ by different voltage levels. In one embodiment, the first to third voltage levels in the P phase are getting higher with time, but the first to third voltage levels in the N phase are getting lower with time.

Based on the foregoing description, in the capacitive sensing and sampling circuit, the sensing unit has the first and second sensing output units to alternatively obtain capacitive signals and output the sensed capacitive signals to the sampling unit. Since the capacitive sensing component is driven by the voltage source with different voltage levels and the number of alternatively sensing the capacitive sensing component is increased, the number of sampling the sensed capacitive signal is relatively increased. Therefore, the white noise interference for the capacitive sensing and sampling circuit is effectively suppressed, so the signal-to-noise ratio is increased and accuracy of detecting coordinates of the touch object is increased, too.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A capacitive sensing and sampling circuit electrically connected to a capacitive sensing component, comprising:
    a voltage source at least having a 1st-P voltage level and a 2nd-P second voltage level; wherein
    an operation period of the voltage source corresponds to a sensing period and the sensing period has a first sensing phase, wherein the operation period has a rise time and a fall time; and
    the rise time of the voltage source corresponds to the first sensing phase and the 1st-P voltage level is smaller than the 2nd-P voltage level in the first sensing phase; and
    a detecting circuit having a first sensing output unit, a second sensing output unit and a sampling unit, wherein the first and second sensing output units are electrically connected between the capacitive sensing component and the sampling unit; wherein:
    the capacitive sensing component is sequentially driven by the voltage source with the 1st-P voltage level and the 2nd-P voltage level, wherein:
    when the capacitive sensing component is driven by the voltage source with the 1st-P voltage level, the first sensing output unit senses the capacitive sensing component and outputs a first capacitive signal to the sampling unit for sampling; and
    when the capacitive sensing component is driven by the voltage source with the 2nd-P voltage level, the second sensing output unit senses the capacitive sensing component and outputs a second capacitive signal to the sampling unit for sampling.

2. The capacitive sensing and sampling circuit as claimed in claim 1, wherein the sensing period further comprises a second sensing phase, the fall time of the voltage source corresponds to the second sensing phase and the voltage source has a 1st-N voltage level and a 2nd-N second voltage level in the second sensing phase; wherein the 1st-N voltage level is larger than the 2nd-N voltage level.

3. The capacitive sensing and sampling circuit as claimed in claim 2, wherein:
    in the first sensing phase, the voltage source further has a 3th-P voltage level larger than the 2nd-P voltage level, wherein the voltage source provides the 3th-P voltage level after the 2nd-P voltage level is provided; and
    in the second sensing phase, the voltage source further has a 3th-N voltage level smaller than the 2nd-N voltage level, wherein the voltage source provides the 3th-N voltage level after the 2nd-N voltage level is provided.

4. The capacitive sensing and sampling circuit as claimed in claim 3, wherein:
    in the first sensing phase, the voltage source further has a 4th-P voltage level larger than the 3th-P voltage level, wherein the voltage source provides the 4th-P voltage level after the 3th-P voltage is provided; and
    in the second sensing phase, the voltage source further has a 4th-N voltage level smaller than the 3th-N voltage level, wherein the voltage source provides the 4th-N voltage level after the 3th-N voltage is provided.

5. The capacitive sensing and sampling circuit as claimed in claim 1, further comprising:
    a sensing unit having multiple inputs and an output, wherein the inputs are respectively and electrically connected to the voltage source and the capacitive sensing component and the output is electrically connected to the first and second sensing output units.

6. The capacitive sensing and sampling circuit as claimed in claim 5, wherein each of the first and second sensing output units comprises:
    a third switch electrically connected between the output of the sensing unit and the sampling unit;
    a sensing capacitor having:

a first end electrically connected to a first connecting node between the third switch and sampling unit; and
a second end electrically connected to a reference voltage of a system power; and
a fourth switch having:
a third end electrically connected to the first end of the sensing capacitor; and
a fourth end electrically connected to a voltage with a reset voltage level.

7. The capacitive sensing and sampling circuit as claimed in claim 5, wherein the detecting circuit further comprises:
an analog gain unit electrically connected between the output of the sensing unit and the first and second sensing output unit.

8. The capacitive sensing and sampling circuit as claimed in claim 5, wherein the sensing unit is electrically connected to the capacitive sensing component through a switching unit and the switching unit comprises:
a first switch electrically connected between one of the inputs of the sensing unit and the capacitive sensing component; and
a second switch having:
a fifth end electrically connected to a second connecting node between the first switch and the capacitive sensing component; and
a sixth end electrically connected to a reference voltage of a system power.

9. The capacitive sensing and sampling circuit as claimed in claim 1, wherein the voltage source is an analog sin wave voltage source or a digital sin wave voltage source.

10. A sensing and sampling method of a capacitive sensing and sampling circuit at least having a first sensing output unit, a second sensing output unit and a sampling unit, wherein the sensing and sampling method comprises steps of:
(a) in a sensing period, driving a capacitive sensing component by a voltage source with a 1st-P voltage level and a 2nd-P second voltage level; wherein
the sensing period corresponds to an operation period of the voltage source and has a first sensing phase, wherein the operation period has a rise time and a fall time; and
the rise time of the voltage source corresponds to the first sensing phase and the 1st-P voltage level is smaller than the 2nd-P voltage level in the first sensing phase;
(b) alternatively sensing the capacitive sensing component by the first and second sensing output units to obtain multiple capacitive signals when the capacitive sensing component is driven by the voltage source with the 1st-P voltage level and the 2nd-P voltage level; and
(c) sampling the capacitive signals by the sampling unit.

11. The sensing and sampling method as claimed in claim 10, wherein:
in the step (a), the 1st-P voltage level and the 2nd-P voltage level are sequentially provided in the first sensing phase;
in the step (b), when the capacitive sensing component is driven by the voltage source with the 1st-P voltage level, the first sensing output unit senses the capacitive sensing component; and when the capacitive sensing component is driven by the voltage source with the 2nd-P voltage level, the second sensing output unit senses the capacitive sensing component.

12. The sensing and sampling method as claimed in claim 11, wherein:
in the step (a), the sensing period has a second sensing phase next to the first sensing phase, wherein the fall time of the voltage source corresponds to the second sensing phase; and in the second sensing period, a 1st-N voltage level is provided before a 2nd-N voltage level is provided.

13. The sensing and sampling method as claimed in claim 12, wherein:
in the step (b), when the capacitive sensing component is driven by the voltage source with the 1st-N voltage level, the first sensing output unit senses the capacitive sensing component; and when the capacitive sensing component is driven by the voltage source with the 2nd-N voltage level, the second sensing output unit senses the capacitive sensing component.

14. The sensing and sampling method as claimed in claim 12, wherein:
in the step (a), a 3th-P voltage level is provided in the first sensing phase after the 2nd-P voltage level is provided and a 3th-N voltage level is provided in the second sensing phase after the 2nd-N voltage level is provided; and
in the step (b), when the capacitive sensing component is driven by the voltage source with the 1st-P, 3th-P and 2nd-N voltage levels, the first sensing output unit senses the capacitive sensing component; and when the capacitive sensing component is driven by the voltage source with the 2nd-P, 1st-N and 3th-N voltage levels, the second sensing output unit senses the capacitive sensing component.

15. The sensing and sampling method as claimed in claim 13, wherein:
in the step (a), a 3th-P voltage level is provided in the first sensing phase after the 2nd-P voltage level is provided, a 3th-N voltage level is provided in the second sensing phase after the 2nd-N voltage level is provided, a 4th-P voltage level is provided in the first sensing phase after the 3th-P voltage level is provided and a 4th-N voltage level is provided the 3th-N voltage level is provided; and
in the step (b), when the capacitive sensing component is driven by the voltage source with the 1st-P, 3th-P, 1st-N and 3th-N voltage levels, the first sensing output unit senses the capacitive sensing component; and when the capacitive sensing component is driven by the voltage source with the 2nd-P, 4th-P, 2nd-N and 4th-N voltage levels, the second sensing output unit senses the capacitive sensing component.

16. The sensing and sampling method as claimed in claim 15, wherein the 1st-N voltage level is larger than the 2nd-N voltage level.

17. The sensing and sampling method as claimed in claim 10, wherein a voltage difference between a pair of the adjacent voltage levels in the first sensing phase is the same as that between a pair of the adjacent voltage levels in the second sensing phase.

* * * * *